Patented Apr. 17, 1923.

1,452,310

UNITED STATES PATENT OFFICE.

GUSTAV MONRATH, OF NEW YORK, N. Y., ASSIGNOR, BY MESNE ASSIGNMENTS, TO THE BARBER ASPHALT PAVING COMPANY, OF PHILADELPHIA, PENNSYLVANIA, A CORPORATION OF WEST VIRGINIA.

ASPHALT COMPOSITION.

No Drawing.   Application filed February 1, 1918.   Serial No. 214,904.

*To all whom it may concern:*

Be it known that I, GUSTAV MONRATH, a citizen of the United States, residing in the city of New York, county of New York, and State of New York, have invented certain new and useful Improvements in Asphalt Compositions; and I do hereby declare the following to be a full, clear, and exact description of the invention, such as will enable others skilled in the art to which it appertains to make and use the same.

This invention relates to asphalt compositions, and in particular to asphalt compositions capable of successfully withstanding comparatively high temperatures without softening and comparatively low temperatures without cracking, and having a desirable hardness combined with toughness, but without objectionable brittleness. The invention has for its object the provision of an improved asphalt composition and in particular the provision of an asphalt composition possessing the above mentioned characteristics.

The ordinary asphalts generally contain petrolene, asphaltene and carbenes in varying proportions. These three components or constituents of asphalt may be generally described as follows:

Petrolene is the constituent or mixture of constituents of asphalts characterized by solubility in 85% naphtha.

Asphaltene is the constituent or mixture of constituents of asphalts characterized by solubility in carbon-tetrachloride;

Carbenes are the constituents of asphalts characterized by solubility in carbon bi-sulfide.

The respective proportions of these three components in different kinds of asphalts may be determined by extraction thereof with the respective solvents above referred to.

I have discovered that when these three components of asphalt, namely, petrolene, asphaltene and carbenes, are combined in certain proportions an asphalt composition is obtained which will successfully withstand both relatively high and relatively low temperatures. The present invention accordingly consists in providing an asphalt composition containing petrolene, asphaltene and carbenes in such proportions that the composition will withstand relatively high temperatures without softening and relatively low temperatures without cracking. Thus, in accordance with my present invention, different asphalts may be combined or blended, in accordance with their respective compositions of these particular components in order to produce a composition containing these components in the relative proportions I have determined. The relative proportions in which these three components should be present, I have found to be substantially the following:

Petrolene about 20 to 30%.
Asphaltene about 50 to 70%.
Carbenes about 10 to 20%.

As hereinbefore suggested, the improved asphalt composition of the present invention may be advantageously made by combining or blending different kinds or grades of asphalt in accordance with their components of petrolene, asphaltene and carbenes, in order to give a resultant composition having these components present in substantially the proportions above set forth. When these three components are present in substantially these proportions, an asphalt composition is obtained having a desirable toughness without objectionable brittleness. The composition is, nevertheless, hard and will stand temperatures around 100° C. without objectionable softening, for example, without softening enough to slide when used as an acid-proof lining for tanks. When used in the form of pipes, the improved asphalt composition will safely convey acid liquors at a temperature around 40 to 80° C. under pressures of 60 to 30 lbs. per square inch. The improved composition will, at the same time, successfully withstand temperatures considerably below freezing without objectionable brittleness or cracking.

The improved asphalt composition of the present invention may be used without admixture with other materials for the production or manufacture of structures, such as pipes, conduits, flumes, or for lining tanks, reservoirs, etc., and so on; but I prefer to make a mastic mixture by adding to the molten asphalt composition above described from 20 to 30% of a fine siliceous dust, of a light bulky character, which will be retained in suspension in the molten asphalt composition as a filler. It is, of course, obvious that any inert inorganic filler having similar physical properties may be used. The resulting molten composition, containing the filler, may then be combined with from 50 to 75% of a silica sand and gravel, so proportioned that the asphalt composition will substantially fill out the voids between the particles of the aggregate. The asphalt composition acts as a cement or binder, and it will usually be desirable to use as small an amount of the material as possible to fill such voids and give the greatest possible tensile strength.

The improved asphalt composition of the present invention, or the mastic compositions made therefrom, by the addition of the siliceous filler and by the further addition of silica sand and gravel, may be used for various purposes where a hard and tough structure is desired, free from objectionable brittleness, and capable of withstanding relatively high temperatures without objectionable softening and low temperatures without cracking. The composition is thus of importance for the production of pipes, inasmuch as pipes or conduits can be made therefrom which will withstand temperatures of boiling water or of steam without undue softening, and which will at the same time be acid-resistant and hence available for the conveyance of hot acid liquor. It has thus been found that pipes made of the improved composition will safely convey hot acid liquors at a temperature from 40 to 80° C. and under a pressure of from 60 to 30 lbs. per square inch. For the conveyance of cold liquor, the pipes can be made to withstand much greater pressures, for example, up to 200 lbs. per square inch or even higher.

In constructing pipes of the new composition, the asphalt mastic may be heated until it is sufficiently fluid to pour into a mold, and the pipe can then be cast in an appropriate mold, for example, in the manner described in my prior U. S. applications, Serial Number 100,413, filed May 27, 1916, and Serial Number 129,959, filed November 7, 1916. It will be evident that the pipes may be made of various sizes and thickness and hence resistant to varying degrees of pressure. So, also, it will be understood that various types and kinds of reinforcements may be embodied in the pipes or conduits, for example, reinforcement such as is used in concrete structures, or reinforcement made of expanded metal lath or perforated metal, etc.

The mastic composition can also be used for the lining of pipes or pipe fittings by casting the molten composition therein, for example, in the manner described in my co-pending U. S. applications, Serial Number 129,958, filed November 7, 1916, and Serial Number 204,713, filed November 30, 1917. By casting the composition within metal pipes or pipe fittings, such pipes and pipe fittings can be made acid resistant throughout, and capable of withstanding not only very high pressures, but also relatively high temperatures without objectionable softening of the asphalt or asphalt mastic lining.

The improved mastic composition is also of importance for lining tanks where it is desirable to store hot acid liquors or other hot liquors requiring a resistant container. The composition may thus be applied in a fluid or semi-fluid condition to a metal lath or other support or reinforcement, and the entire tank or other receptacle thereby lines with the acid resistant composition. The apparatus, such as reservoirs and the like, described in my U. S. Letters Patent No. 1,219,840, patented March 20, 1917, may, with advantage, be lined with the improved mastic composition.

Pumps and other apparatus for conveying or storing hot acid liquors may be similarly lined with the improved mastic composition, or may have parts of their structures made of such composition. In general, it may be stated that the improved composition is available for the production of various structures by heating the composition to a temperature enabling it to be cast or otherwise worked or applied to produce the desired structure or lining, and by then permitting the composition to cool and set in its desired form or shape. Where conduits are desired, which are not entirely enclosed, such as flumes, a lining of the composition may be applied to the bottom of the flume, and the desirable resistance to hot acid liquors and to high temperatures will be thereby obtained.

I claim:

1. An asphalt composition comprising the following ingredients in substantially the following proportions: petrolene about 20 to 30%; asphaltene about 50 to 70%; carbenes about 10 to 20%.

2. An asphalt mastic composition containing the following ingredients in substantially the following proportions: petrolene about 20 to 30%; asphaltene about 50 to 70%; carbenes about 10 to 20%, and an inorganic filling material.

3. An asphalt mastic composition comprising about 20 to 30% of a fine siliceous filler, and an asphalt composition containing the following ingredients in substantially the following proportions: petrolene about 20 to 30%; asphaltene about 50 to 70%; carbenes about 10 to 20%.

4. An asphalt mastic composition containing from 50 to 70% of a silica sand and gravel, admixed with an asphalt composition containing the following ingredients in substantially the following proportions: petrolene about 20 to 30%; asphaltene about 50 to 70%; carbenes about 10 to 20%, and to which has been added from 20 to 30% of a fine silicious filler.

5. An asphalt mastic composition comprising sand and gravel cemented together by an asphalt composition containing the following ingredients in substantially the following proportions: petrolene about 20 to 30%; asphaltene about 50 to 70%; carbenes about 10 to 20%, together with a fine siliceous filler.

In testimony whereof I affix my signature.

GUSTAV MONRATH.